United States Patent [19]

Mösslacher

[11] Patent Number: 5,101,684
[45] Date of Patent: Apr. 7, 1992

[54] STAND-BY DRIVE OPERABLE BY A CRANK HANDLE

[76] Inventor: Hannes Mösslacher, Kravogelstr. 49, 8000 Müchen 60, Fed. Rep. of Germany

[21] Appl. No.: 552,566

[22] Filed: Jul. 16, 1990

[30] Foreign Application Priority Data

Jul. 28, 1989 [DE] Fed. Rep. of Germany ... 8909180[U]

[51] Int. Cl.⁵ .......................... G05G 1/08; E05F 15/00
[52] U.S. Cl. .......................................... 74/625; 74/545; 296/223; 296/216
[58] Field of Search .................. 74/545, 625; 296/223, 296/216

[56] References Cited

U.S. PATENT DOCUMENTS

| | | | |
|---|---|---|---|
| 3,103,830 | 9/1963 | Allaria | 74/625 |
| 3,791,071 | 2/1974 | Niklaus | 74/625 |
| 4,085,629 | 5/1978 | Fogarollo | 74/625 |
| 4,659,140 | 4/1987 | Fuerst et al. | 296/216 X |
| 4,841,812 | 6/1989 | Fuerst et al. | 475/12 |
| 4,928,547 | 5/1990 | Huyer | 296/223 X |

FOREIGN PATENT DOCUMENTS

| | | |
|---|---|---|
| 0299156 | 1/1989 | European Pat. Off. . |
| 1963312 | 6/1967 | Fed. Rep. of Germany . |
| 1276498 | 8/1968 | Fed. Rep. of Germany . |
| 2553667 | 7/1976 | Fed. Rep. of Germany . |
| 7720015 | 10/1977 | Fed. Rep. of Germany . |
| 2659283 | 7/1978 | Fed. Rep. of Germany . |
| 3529753 | 1/1987 | Fed. Rep. of Germany . |
| 3741615 | 6/1989 | Fed. Rep. of Germany . |
| 3824729 | 1/1990 | Fed. Rep. of Germany . |

*Primary Examiner*—Leslie A. Braun
*Assistant Examiner*—Daniel Wittels
*Attorney, Agent, or Firm*—Beveridge, DeGrandi & Weilacher

[57] ABSTRACT

Stand-by drive operable by a crank handle in a drive unit actuable by means of an electric motor, in particular for sliding roofs of motor vehicles, wherein the drive unit comprises a gear which is connected to the electric motor, while an output part of the gear extending from the gear cooperates with the mechanism to be operated, wherein a stand-by operation part (5) biased by a spring (10) positively engages in its position corresponding to the normal state of the drive unit the output part (4) and a coaxial gear wheel (3) in such a way that the stand-by operation part (5) is axially displaceable, against the force of the spring, by slight pressure through a stand-by operation tool (15) also positively insertable in the stand-by operation part (5), from the engagement with the gear wheel (3) to a stand-by operation position only engaging the output part (4).

14 Claims, 2 Drawing Sheets

STAND-BY DRIVE OPERABLE BY A CRANK HANDLE

BACKGROUND OF THE INVENTION

1. Field of the Invention

The invention relates to a stand-by drive operable by a crank handle in a drive unit actuable by means of an electric motor, in particular for sliding roofs of motor vehicles, wherein the drive unit comprises a gear which is connected to the electric motor, while an output part of the gear extending from the gear cooperates with the mechanism to be operated.

2. Background Discussion

Such stand-by drives, which in case of electric motor failure allow the actuation of the mechanism operable by the drive unit to be continued externally, have been known for a long time. Such a stand-by drive is mostly operated manually by means of a crank handle. In particular in sliding roofs of motor vehicles, the possibility of opening and closing the sliding roof has to be maintained. In view of the constructional space problems encountered particularly in the accommodation of electric motors for the actuation of sliding roofs, very small electric motors having a low torque are used at higher speeds in combination with an output gear having a great reduction ratio, mostly a worm gear, thus enabling the sliding roof to be operated at the desired speed with a high opening and closing force, respectively.

Since in conventional stand-by drives the output part—mostly a gearwheel, worm wheel or belt drive exiting from the gear and cooperating with the mechanism to be actuated—cannot be disengaged from the gear, and hence from the motor, for the purpose of a stand-by operation, difficulties in the manual stand-by operation arise from the high reduction ratio and the worm gear mostly used for achieving it.

Various kinds of stand-by drives are known. For example, it is known to provide the motor shaft of the electric motor with a worm of great lead and to provide the output part with a form-fit receiver for a crank handle. By very great efforts, the worm—and with it the entire motor shaft—can then be rotated through the gear and the worm wheel meshing with the worm. Such an arrangement has turned out disadvantageous in that very high manual forces are necessary, and due to its high lead, the worm no longer assures satisfactory self-locking. Thus, the sliding roof may slide unintentionally by itself, in particular owing to vibrations and jerks caused by rough ground when driving.

Another conventional stand-by drive provides a rotating lever to be positively inserted in an extension of the motor shaft and allowing the motor shaft to be rotated manually. A disadvantage of this arrangement is that the great reduction ratio of the gear requires numerous turns to be made in carrying out the stand-by operation. This accordingly results in long stand-by operation periods unacceptable in many applications, which is in particular also true for several applications different from sliding roofs. A further problem in this type of stand-by drive is the sealing of the motor, i.e. the sealing of the place where the extended motor shaft exits. Conventionally, the extended motor shaft exits on the motor side opposite to the gear connection side. The gear box is flanged to the motor and does not cause any sealing problems, as the motor shaft exiting there from the motor casing and penetrating into the gear box is completely enclosed by the gear box. Consequently, sealing problems only occur on the motor side where conventionally, the extension of the motor shaft designed for inserting the rotating lever is arranged.

A further conventional stand-by drive provides a friction clutch between the output part and the gear, the clutching force being exerted by disk springs. In case of stand-by operation, the disk springs can be released and, thus, the output part can be rotated independently of the gear and motor. However, in this arrangement it has proven disadvantageous that the rebending of the disk springs, i.e. the adjustment of the clutching force, entails considerable mounting work to be carried out in a garage. Further disadvantages result from the fact that after release of the clutch normally no position detection is any longer possible, and from the fact that the clutching force, and hence the torque transferable by the clutch, vary in the course of time.

SUMMARY OF THE INVENTION

The invention solves the problem of providing a pertinent stand-by drive which assures easy actuation within a small number of rotations without necessitating additional work for re-establishing the normal operating state after having operated the stand-by drive once or several times.

According to the invention, this problem is solved by the features that a stand-by operation part biased by a spring positively engages in its position corresponding to the normal state of the drive unit, the output part and a coaxial gear wheel in such a way that the stand-by operation part is axially displaceable, against the force of the spring, by slight pressure through a stand-by operation tool also positively insertable in the stand-by operation part, from the engagement with the gear wheel to a stand-by operation position only engaging the output part.

Preferably, the end of the stand-by operation part which positively engages the output part and the gear is provided with a pilot journal guided in a bore penetrating the face of the output part. This provides a better guidance of the stand-by operation part, when it is axially displaced from its engagement with the gear wheel into the stand-by operation position, and vice versa. In addition, the pilot journal provides the possibility of arranging around it a pressure coil spring having a first end bearing against the stand-by operation part and a second end bearing against the output part.

Preferably, the stand-by operation tool is a crank handle comprising a positive hexagon profile at the end which is insertable into the stand-by operation part. However, other stand-by operation tools are possible, such as a rotating lever equally rotatable by hand, or possibly even a second external electric motor.

The positive engagement of the output part and the gear wheel with the stand-by operation part is preferably formed as a hexagon driver or, for transferring higher torques, as a star-shaped driver, as known e.g. for cylinder head studs that have to be tightened at a high torque.

BRIEF DESCRIPTION OF THE DRAWINGS

In the following, the stand-by drive according to the invention will be described in greater detail with reference to the drawing wherein there is shown in FIG. 1 the stand-by drive according to the invention prior to the insertion of the crank handle, the stand-by operation part being in its position corresponding to the normal operating state of the drive unit; and in FIG. 2 stand-by drive according to the invention after the insertion of the crank handle, the stand-by operation part being in its stand-by operating position.

DETAILED DESCRIPTION OF THE DRAWINGS

Figure 1:
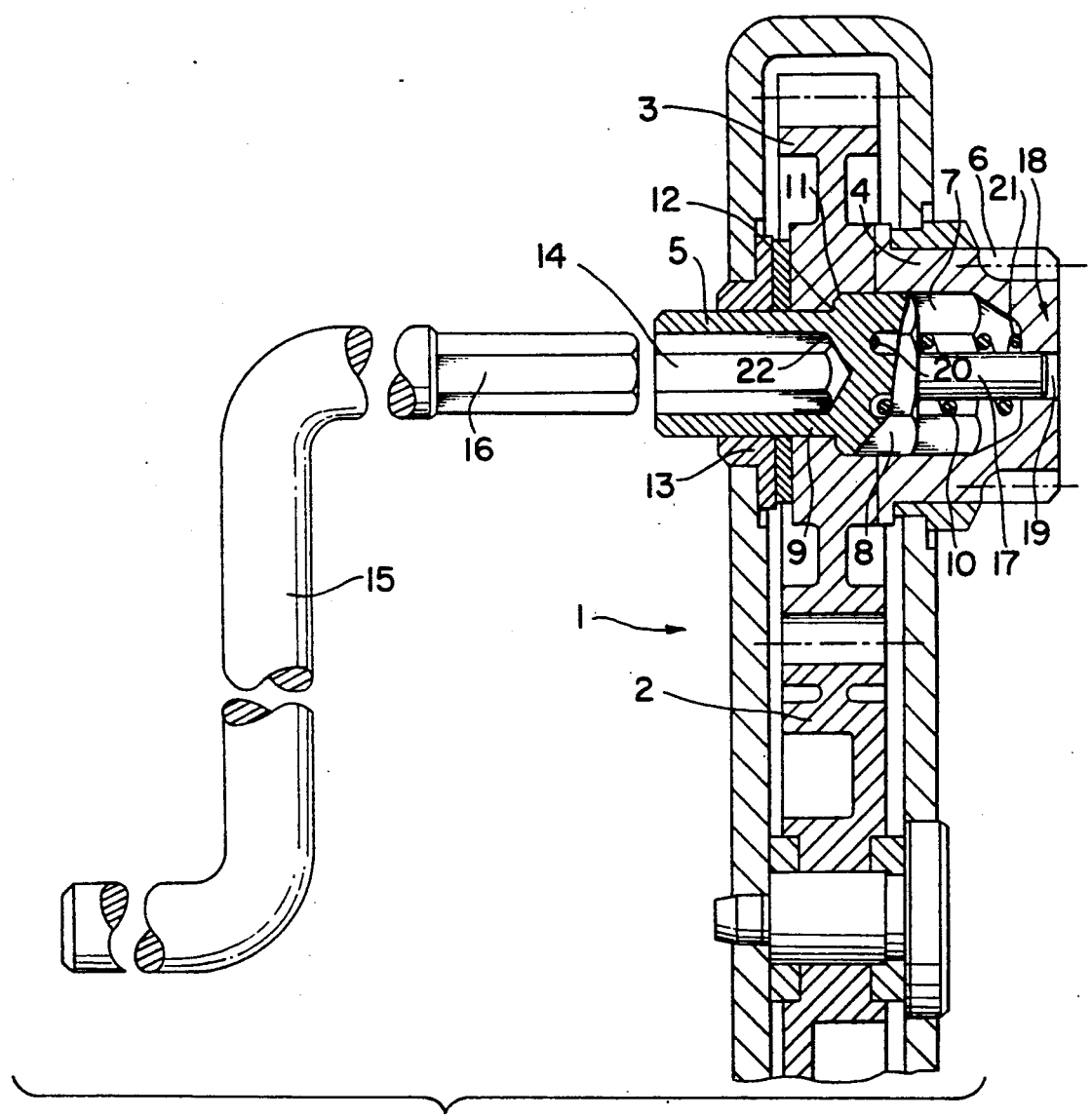

FIG. 1 shows a partial representation of gear 1 in the normal operating state, i.e. with the stand-by drive being out of action. A first gear wheel 2, which is only partly represented in the drawing, engages a worm, or a spur pinion mounted thereto, arranged on the motor shaft of an electric motor M as shown schematically in FIG. 2. The first gear wheel 2 in turn engages a gear wheel 3 whose axis of rotation is coaxial with an output part 4 and a stand-by operation part or member 5. Through a toothing 6, the coaxial output part 4 is connected to the driven mechanism R shown schematically in FIG. 2, which may be for instance a sliding roof mechanism.

A hexagon-shaped recess 7 is arranged in the output part 4 and the coaxial gear wheel 3. The outer surface of the stand-by operation part 5 consists of a positively hexagon-shaped portion 8 and a cylindrical portion 9. The positively hexagon-shaped portion 8 of the stand-by operation part 5 is received in the hexagon-shaped recess 7 in a locking manner and, thus, provides form closure between the output part 4 and the coaxial gear wheel 3 in the normal operating state; this form closure is suitable for transferring torques from the coaxial gear wheel 3 to the output part 4. In the normal operating state of the drive unit, the stand-by operation part 5 is urged by a biased pressure coil spring 10 against an annular shoulder 11 within the gear wheel 3 where the hexagon-shaped recess 7 terminates in the gear wheel 3 and changes to a cylindrical bore 12. The cylindrical portion 9 of the stand-by operation part 5 exits from gear 1 through the cylindrical bore 12 and a bearing bush 13.

The cylindrical portion 9 of the stand-by operation part 5 extending from the gear 1 is provided with an inner hexagon socket 14 into which a positive hexagon end 16 formed on the crank handle 15 ca be inserted.

A pilot journal 17 projects from the positively hexagon-shaped portion 8 of the stand-by operation part 5 and is guided in a bore 19 penetrating the face 18 of the output part 4. The biased pressure coil spring 10 surrounds the pilot journal 17, and its first end 20 bears against an annular groove formed in the stand-by operation part 5, while its other end 21 bears against the bottom of the hexagon-shaped recess 7 in the output part 4.

Figure 2:
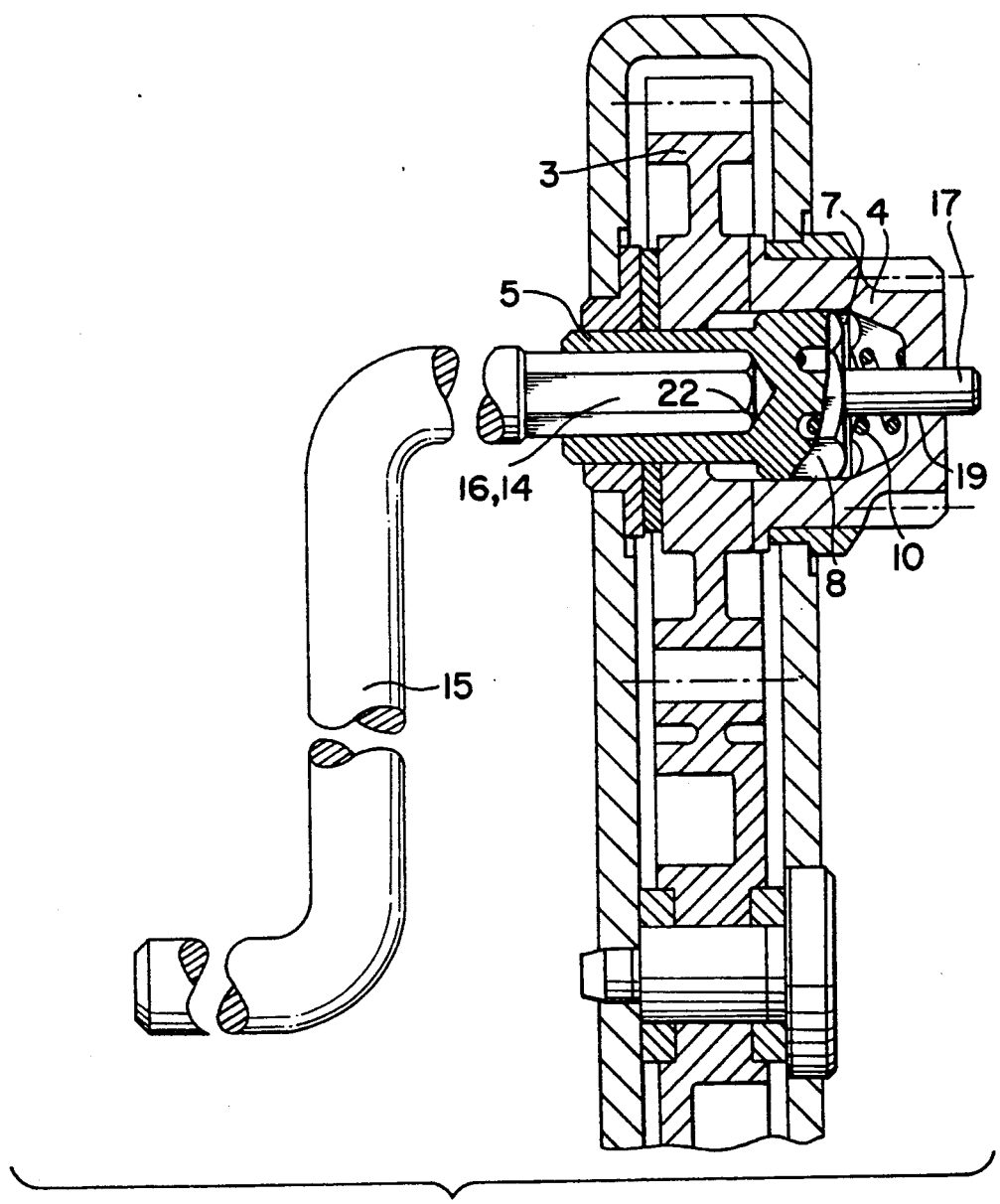

FIG. 2 shows a representation corresponding to FIG. 1, but differing therefrom in that the crank handle 15 was inserted and the stand-by operation part 5 was displaced into its stand-by operation position. To this end, the positive hexagon end 16 of the crank handle 15 was introduced into the inner hexagon socket 14 and brought into abutment with the stop 22 formed by the bottom of the inner hexagon socket 14. When the crank handle 15 was pushed further against the force of the pressure coil spring 10, the positively hexagon-shaped portion 8 of the stand-by operation part 5 was displaced through stop 22 from its form closure with gear wheel 3, thus also forcing the pilot journal 17 entirely through the bore 19 formed in output part 4. In this stand-by operation position, the positively hexagon-shaped portion 8 of the stand-by operation part 5 positively engages only the hexagon-shaped recess 7 of output gear member or part 4 and the opposite end is in driving engagement with the positive hexagon end 16 formed on the crank handle 15. The output part 4 can now be driven with the help of the crank handle 15 without being in any form-fit connection with gear 1 and its associated electric motor.

When the stand-by operation is finished and the crank handle 15 pulled out, the stand-by operation part 5 is urged back to its normal operating position by the pressure coil spring 10, thus re-establishing a form-fit, torque-transferring connection between the coaxial gear wheel 3 and the output part 4.

What is claimed is:

1. A stand-by drive for driving a mechanism with the stand-by drive being operable by an operational tool when in a stand-by mode and by a motor when in a normal operation mode, comprising:

a first gear adapted for driving communication with the motor;

an output gear member adapted for driving engagement with the mechanism;

a second gear in driving communication with said first gear;

a spring;

a stand-by operation member, which has means for positive drive transmitting engagement with the operational tool, is in contact with said spring and biased by said spring into a normal operating position wherein said stand-by operation member positively engages both said second gear and said output gear member, said stand-by operation member being dimensioned and arranged such that said stand-by operation member, upon an axial pressure being applied by the operation tool, is axially displaceable with respect to said second gear against the force of said spring into a stand-by position wherein said stand-by operation member is in a non-drive transmitting relationship with said second gear and in positive drive transmitting engagement with both said output gear member and the operational tool such that, upon being driven by the operational tool, said stand-by operation member drives said output gear member.

2. A stand by drive according to claim 1 wherein said stand-by operation member extends through a central aperture in said second gear such that said stand-by operation member is coaxially arranged with said second gear.

3. Stand-by drive according to claim 2, wherein an end of the stand-by operation member which positively engages the output gear member is provided with a pilot journal guided in a bore formed in said gear member.

4. Stand-by drive according to claim 2, wherein said spring is a pressure coil spring surrounding said pilot journal and having a first end bearing against said stand-by operation member, and a second end bearing against said output gear member.

5. A stand-by drive according to claim 2 wherein said spring is a coil spring having a first end in contact with said stand-by operation member and a second end in contact with said output gear member.

6. Stand-by drive according to claim 2, wherein the positive engagement of said output gear member and said second gear with said stand-by operation member includes a hexagonal driver arrangement.

7. A stand-by drive assembly for driving a mechanism in both a stand-by mode and a normal operation mode, comprising:
- a first gear adapted for driving communication with a motor;
- a second gear in driving communication with said first gear;
- an operational tool;
- a stand-by operation member extending through said second gear and dimensioned and arranged so as to be axially displaceable with respect to said second gear, said stand-by operation member having means for positive driving engagement with said operational tool;
- an output gear member positioned to one side of said second gear;
- a spring being positioned so as to bias said stand-by operation member into a normal operation mode position wherein said stand-by operation member is in driving engagement with both said second gear and said output gear member, and said stand-by operation member being dimensioned and arranged such that said stand-by operation member is axially shiftable with respect to said second gear and against the force of said spring into a stand-by operation position wherein said stand-by operation member is in a non-drive transmitting relationship with said second gear and in a positive drive transmitting relationship with both said output gear member and said operational tool such that rotation of said operational tool, while said stand-by operation member is in the stand-by operation position, results in rotation of said output gear member.

8. Stand-by drive assembly according to claim 7, wherein said operation tool is a crank handle.

9. Stand-by drive assembly according to claim 8, wherein an end of the crank handle is dimensioned for insertion into a hole formed in said stand-by operation member and the end of said crank handle has a hexagonal profile.

10. A stand-by drive according to claim 7 further comprising a pilot journal extending off of the second end of said stand-by operation member, and said spring being a coil spring which is in position around said pilot journal, and said output gear member including a bore which slidingly receives said pilot journal when said stand-by operation member is in a stand-by operation mode.

11. A stand-by drive operable by an operational tool in a stand-by mode and a motor in a normal operation mode, comprising:
- a driving gear adapted for driving communication with the motor;
- a driven gear in driving communication with said driving gear;
- a stand-by operation member extending through an aperture formed in said driven gear and to opposite sides of said driven gear, said stand-by operation member having a first end which has means for engagement with the operation tool, a mid-section adapted for driving engagement with said driven gear, and a second end;
- an output gear member in driving engagement with the second end of said stand-by operation member, and said output gear member having a recess formed therein within which the second end of said stand-by operation member extends;
- a spring having a first end positioned within the recess formed in said output gear member and in contact with said output gear member, and said spring having a second end in contact with the second end of said stand-by operation member;
- said stand-by operation member being dimensioned and arranged so as to be axially slidable within the aperture formed in said driven gear and the recess formed in said output gear member between a first normal operation position wherein said stand-by operation member is in driving engagement with both said driven gear and said output gear member and a second stand-by operation position wherein, following connection of the operable tool with said stand-by operation member, said spring is placed in a higher state of compression and said stand-by operation member is disengaged from said driven gear and in positive drive transmitting engagement with both said output gear member and the operational tool such that rotation of the operational tool results in rotation of said stand-by operation member in the stand-by operation position and, in turn, rotation of said output gear member.

12. A stand-by drive according to claim 11 wherein the aperture formed in said second gear includes a cylindrical-shaped bore and a multi-sided bore, and the mid-section of said stand-by operation member has a circular periphery slidingly received within said cylindrical bore, and the second end of said stand-by operation member includes a multi-sided external periphery which corresponds with said multi-sided bore, and the recess in said output gear member being defined by a multi-sided wall which corresponds with the multi-sided external periphery of said stand-by operation member.

13. A stand-by drive according to claim 12 wherein said multi-sided bore is hexagonal in shape.

14. A stand-by drive according to claim 11 further comprising a pilot journal extending off of the second end of said stand-by operation member, and said spring being a coil spring which is in position around said pilot journal, and said output gear member including a bore which slidingly receives said pilot journal when said stand-by operation member is in a stand-by operation mode.

* * * * *